United States Patent [19]

Hille et al.

[11] 4,167,694

[45] Sep. 11, 1979

[54] CONTROL DEVICE FOR A PERIODICALLY OSCILLATING MEMBER

[75] Inventors: Eduard Hille; Jürgen Andermann, both of Dülmen, Fed. Rep. of Germany

[73] Assignee: Hergeth KG Maschinenfabrik und Apparatebau, Dülmen, Fed. Rep. of Germany

[21] Appl. No.: 856,943

[22] Filed: Dec. 2, 1977

[30] Foreign Application Priority Data

Dec. 3, 1976 [DE] Fed. Rep. of Germany ....... 2654895

[51] Int. Cl.² ............................ H02P 5/00; H02P 7/00
[52] U.S. Cl. ................................ 318/321; 192/142 R; 318/282; 318/468; 318/267
[58] Field of Search ............... 318/127, 128, 266, 267, 318/286, 282, 468, 469, 626, 443, 444, 321; 200/47, 295, 153 W; 192/141, 142 R, 143

[56] References Cited

U.S. PATENT DOCUMENTS

| | | | |
|---|---|---|---|
| 1,936,572 | 11/1933 | Carroll et al. | 200/47 |
| 2,105,514 | 1/1938 | Welch | 318/469 |
| 2,854,113 | 9/1958 | Hallden | 192/143 |
| 3,825,809 | 7/1974 | Gatland et al. | 318/286 |

*Primary Examiner*—David Smith, Jr.
*Attorney, Agent, or Firm*—John C. Smith, Jr.

[57] ABSTRACT

A control device is disclosed for controlling the drive means and consequently the oscillation range of a periodically oscillating member particularly when it is necessary to maintain the speed of the periodic oscillation movement such that it corresponds to the average speed of another drive unit. Two movably mounted sensors are located near opposite ends of a predetermined oscillation range of the oscillating member. When either of the sensors senses the presence of the oscillating member beyond the predetermined oscillation range, a signal is generated by the sensor which is transmitted to control means adapted to adjust the speed of the drive means operating the oscillating member.

12 Claims, 7 Drawing Figures

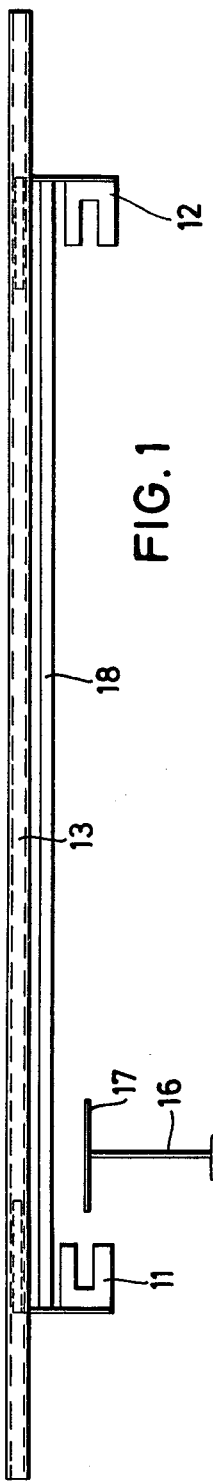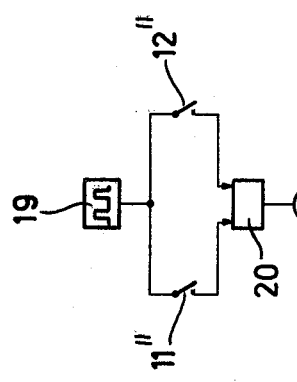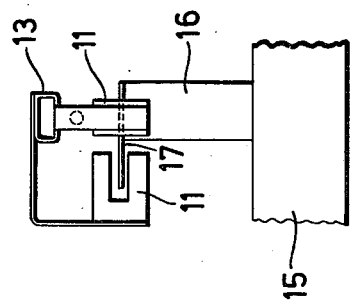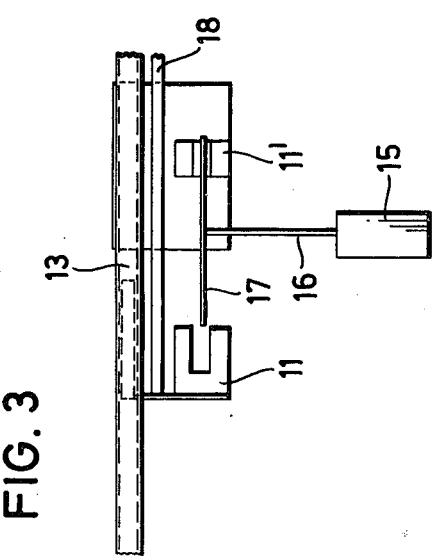

CONTROL DEVICE FOR A PERIODICALLY OSCILLATING MEMBER

BACKGROUND OF THE INVENTION

This invention relates to a control device for a periodically oscillating member, the amplitudes of which in opposite directions are different from each other when a predetermined balanced condition is not maintained.

Frequently, it is necessary to adapt the drive of an oscillating member to the average speed of another drive unit. For example, if the input of material into a machine is continuous or discontinuous and the oscillating member serves to process the material in the machine or to discharge the material from the machine, it is frequently necessary to maintain the speed of the periodic oscillation movement such that it corresponds to the average speed of the input of material so that the amount of material discharged from the machine consistently corresponds on the average to the amount of material supplied to the machine.

If the amplitude of the oscillating member in one direction surpasses and in the other direction falls short of the predetermined average speed of the drive unit, the oscillation range of the oscillating member is caused to migrate due to the incorrect drive speed. The deviation from the correct drive speed is cumulative so that the oscillating range is altered. If limit switches are positioned at the opposite predetermined limits of the oscillation range, a signal will be emitted by one of the limit switches each time the oscillating member exceeds the position of the one limit switch which could serve to adjust the speed of the drive unit. However, the limit switch would also emit a signal when the oscillating member stopped and did not exceed the position of the limit switch causing the speed of the drive unit to be changed even though such change was not warranted. If, when simple limit switches are used, a pulse clock is transmitted via a closed limit switch so that adjusting pulses are supplied to the drive unit, too many adjusting pulses will be transmitted over too long a period of time with each amplitude so that the control circuit tends to cause overmodulation which is a disadvantage.

It is an object of the present invention to provide a simple and economically constructed control device for use with a periodically oscillating member which does not have the disadvantages of overcontrol and undercontrol oscillations.

SUMMARY OF THE INVENTION

The apparatus of the present invention includes at least two sensors located near opposite ends, respectively, of the path of the periodically oscillating member. The sensors are movably mounted such that, when the amplitude of the periodically oscillating member extends beyond a predetermined oscillating range, one of the sensors will be moved by the periodically oscillating member to the final position of the member. The sensors do not hamper the movement of the oscillating member. Upon reaching the end of the oscillation, the influence of the oscillating member on the sensor is terminated. The electrical correction signal emitted by the sensor is only generated during the advance travel of the oscillating member.

To avoid generating sensor signals in the normal predetermined oscillating range of the oscillating member, which range is maintained when the drive speed of the oscillating member is exactly adjusted to the predetermined average speed, an auxiliary sensor may be stationarily mounted at a predetermined location along the path of the oscillating member adjacent each movable sensor which auxiliary sensor serves to suppress signals from the corresponding movable sensor as long as the oscillating member is within the predetermined oscillating range. The sensors may be arranged to be ineffective in specific oscillating ranges.

The return travel of each of the movable sensors to its starting or normal position may be accomplished by the oscillating member during movement in the opposite direction. The two movable sensors may be rigidly coupled at a predetermined distance from each other so that each sensor during its travel with the oscillating member causes the other sensor to move in the same direction. Thus, when one movable sensor is moved by the oscillating member, the opposite movable sensor is moved to the same extent.

In another embodiment, each of the movable sensors is biased in the direction of its starting or normal position. A retaining device serves to temporarily retain each sensor at the position to which it is moved by the oscillating member so that the sensor does not immediately return to its starting position upon movement of the oscillating member in the opposite direction. The retaining device may be released by the oscillating member during its movement in the opposite direction allowing the sensor to return to its starting position. The retaining device may consist of a pivotally mounted rack fitted with a plurality of teeth so that the sensor will be retained by one of the teeth at the position at which the oscillating member stops. A cam bar near the opposite end of the pivotally mounted rack is arranged to be moved by the oscillating member during its movement in the opposite direction releasing the retained sensor from the rack and allowing the sensor to return to its starting position. In this embodiment the sensors will always be at predetermined starting positions when they are contacted by the oscillating member.

In a further embodiment, the sensors may be arranged on pivoted arms such that they move along arcuate paths rather than along straight paths. In this embodiment the two pivoted arms include projections, and the opposite ends of a rod are pivotally mounted on the projections such that the pivoted arms are in parallel alignment with each other. The angle sectors covered during movement of the coupled sensors, however, are unequal. The returning sensor moves more quickly towards its starting position than the sensor moved by the oscillating member which emits adjustment pulses to the drive unit. This arrangement wherein the returning sensor moves more quickly to the starting position than the other sensor being moved away from the starting position by the oscillating member has the advantage that a desired average value is obtained automatically and the position of the oscillation range of the oscillating member remains within predetermined limits.

BRIEF DESCRIPTION OF DRAWINGS

FIG. 1 is a schematic side view of the periodically oscillating member and a first embodiment of the control device;

FIG. 2 is a block diagram showing the control system and drive unit for the periodically oscillating member;

FIG. 3 is a schematic partial side view of the periodically ocillating member and a second embodiment of the control device incorporating an auxiliary sensor;

FIG. 4 is a schematic front view of the arrangement shown in FIG. 3;

DETAILED DESCRIPTION OF INVENTION

Figure 5:
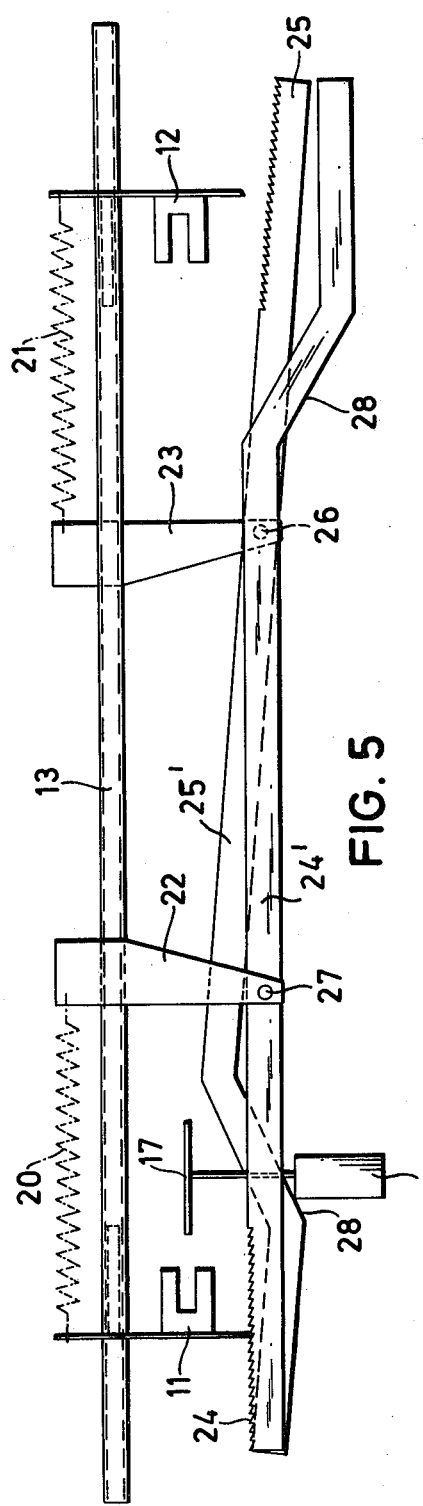
FIG. 5 is a schematic side view of the periodically oscillating member and a third embodiment of the control device.

Referring to FIG. 1, two sensors 11, 12 are slidably mounted on a guide rail 13 and are connected to each other by a rigid bar 18. The guide rail 13 extends parallel to the path of oscillating member 15 as indicated by the double arrow 14. The oscillating member 15 has a projecting arm 16 with an arm 17 extending in opposite directions from the arm 16. The arm 17 is arranged to enter and actuate sensors 11 and 12 as the oscillating member 15 moves along its path.

The sensors 11, 12 are mechanical or electrical switches which respond to the presence of an element within a predetermined area. Examples of a sensor include a simple mechanical limit switch, an electronic approximation initiator, a light barrier, etc.

An example of an electrical circuit for the sensors and control system is shown in FIG. 2. Sensors 11, 12 serve to operate switches 11", 12". Alternatively, sensors 11, 12 may themselves be switches 11", 12". Both switches 11, 12 are connected with a pulse generator 19 generating pulses with adjustable frequency and constant amplitude. When one of the sensors 11, 12 responds to the presence of the oscillating member 15, the corresponding switch 11", 12" is closed and the control device 20 receives at one of its inputs a pulse number which corresponds to the closing time of the corresponding switch. The pulse number may be converted by an integrator or a counter and a subsequently connected DIA converter to an electrical direct voltage which is used, in a known manner, to increase or reduce the speed of drive motor 21 which drives the oscillating member 15. A pulse sequence supplied to the control device 20 via switch 11" causes a reduction in the speed of the motor 21, and a pulse sequence supplied to the control device via switch 12" causes an increase in the speed of the motor 21.

When, in the arrangement illustrated in FIG. 1, the oscillating member 15 moves to the left side, arm 17 actuates sensor 11 causing the corresponding switch to close. If oscillating member 15 moves further to the left than the position of sensor 11, both sensors 11 and 12 will be pushed to the left along guide rail 13 to a position where the oscillating member 15 finally stops. Oscillating member 15 then moves in the opposite direction to a point where arm 17 actuates the opposite sensor 12. If the oscillating member 15 continues to move to the right, the sensors 11 and 12 will also be moved to the right along guide rail 13 to a position where the oscillating member 15 finally stops.

FIGS. 3 and 4 illustrate a variation of the embodiment illustrated in FIG. 1 in that auxiliary sensors are provided in addition to sensors 11, 12 (only auxiliary sensors 11' is shown). The auxiliary sensor 11' is mounted in a fixed position on guide rail 13, the fixed position being adjacent the normal position of sensor 11. This normal position of sensor 11 is the position at which the sensor 11 may be actuated but is not moved further along the guide rail 13 by the oscillating member 15 such that no speed adjustment of the drive for the oscillating member 15 is required. Unlike sensor 11, auxiliary sensor 11' is designed as a rest contact. It incudes a switch which in non-excited condition is closed and in excited condition is open. The auxiliary sensor 11' is included in the electrical circuit to prevent pulses reaching the control device 20 via sensor 11 as long as the arm 17 actuates auxiliary sensor 11'. The adjustment pulses arriving via sensor 11 only become effective when the sensor 11 has been pushed past a predetermined position by the oscillating member such that the arm 17 no longer actuates auxiliary sensor 11'. This position can be adjusted by displacement of the auxiliary sensor 11' on the guide rail 13.

Although the rigid bar 18 is shown as being nonadjustable, it may consist of several members so that its length may be adjusted. This may be achieved by arranging the members telescopically or by including a threaded sleeve.

Referring to FIG. 5, the sensors 11, 12 are mounted for independent displacement along guide rail 13. The sensors 11, 12 are not connected to each other by a bar. Tension springs 20, 21 extend respectively between the sensors 11, 12 and elements 22, 23. The tension springs 20, 21 bias the sensors 11, 12 towards starting or normal positions of the sensors, respectively.

The sensors 11, 12 are retained in the position to which they are pushed by oscillating member 15 by pivotally mounted rods 24', 25' having saw-teeth or racks 24, 25, respectively. Thus, as sensor 11 is pushed to the left, the rack 24 acts as a ratchet retaining the sensor 11 at the position to which it is pushed by oscillating member 15 after which oscillating member 15 travels in the opposite direction.

Rods 24' and 25' are pivoted about pivot points 26 and 27, respectively. Each rod 24, 25 opposite the saw-teeth includes a cam surface 28 which is actuated by oscillating member 15. When the oscillating member 15 presses against a cam surface 28, the opposite end of the rod 24', 25' containing the saw-teeth 24, 25 is pivoted downwardly releasing the retained sensor. The tension spring 20, 21 immediately returns the sensor to its starting or normal position. Due to the fact that the length of the rod 24', 25 containing the cam surface 28 on one side of the pivot point 26, 27 is longer than the length of the same rod containing the saw-teeth 24, 25 on the opposite side of the pivot point, the saw-teeth 24, 25 are biased upwardly providing the ratchet action due to gravitation, avoiding the need for additional springs.

In the arrangement illustrated in FIG. 5, the sensor 11 returns to its starting or normal position when oscillating member 15 presses against the cam surface 28 to the right. This occurs before arm 17 actuates sensor 12.

Figure 6:
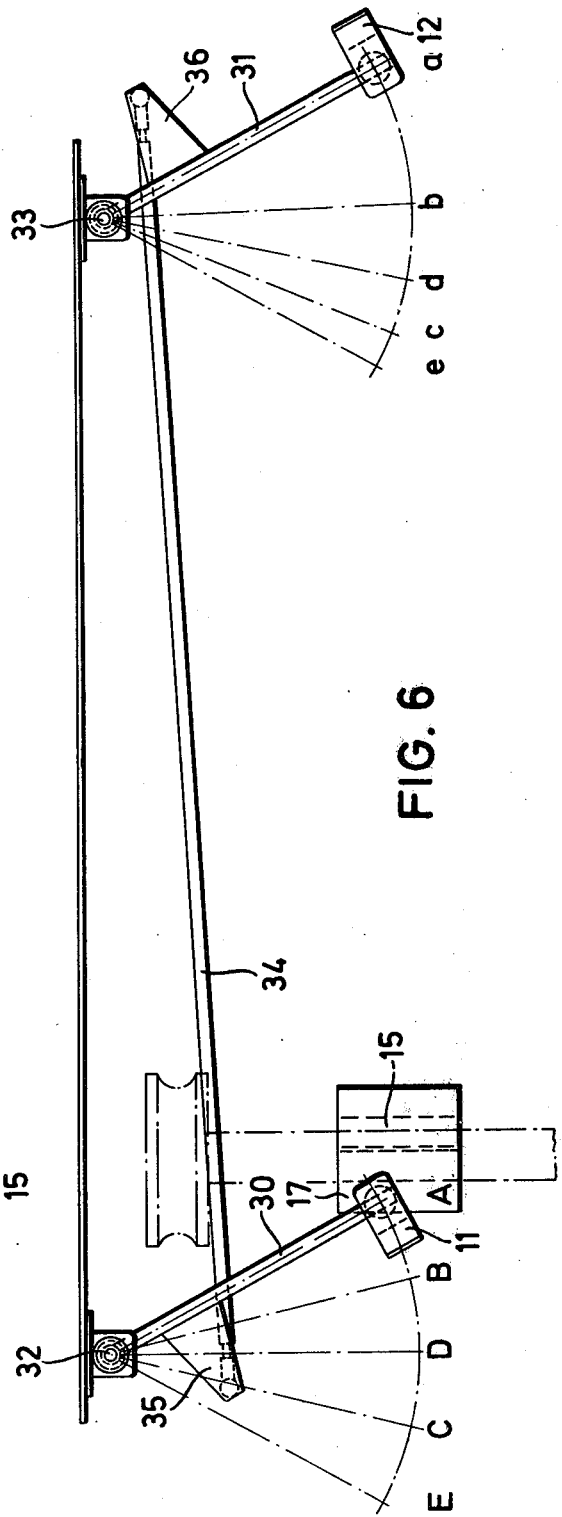
FIG. 6 is a schematic plan view of the periodically oscillating member and a fourth embodiment of the control device.

Referring to FIG. 6, sensors 11, 12 are mounted on pivot arms 30, 31, respectively, which are pivoted about stationary vertical axes 32, 33. Thus, each sensor, when moved by oscillating member 15, follows an arcuate path.

The two pivot arms 30, 31 include projections 35, 36, respectively, extending in opposite directions. A rod 34 is pivotally mounted at opposite ends to the projections 35, 36. The length of the rod 34 is adjustable and is so adjusted that the pivot arms 30, 31 extend parallel to each other when the pivot arms are located at their extreme positions, as for example at positions A, a, respectively, as illustrated in FIG. 6. Due to the fact that the projections 35, 36 extend in opposite directions away from each other, the rod 34 does not extend constantly in parallel to a line drawn between the axes 32, 33.

When sensor 11 is moved from position A to position B by oscillating member 15, sensor 12 is moved from position a to position b. It will be noted, however, that sensor 12 moves through a greater distance and thus more quickly than does sensor 11 which has also been moved and transmits the adjustment pulses for controlling the drive speed of the oscillating member 15. When sensor 11 moves to position C or E, sensor 12 is moved to position c or e. The angular sector covered by sensor 12, however, becomes smaller while the size of the angular sectors through which the sensor 11 is moved remains constant. It will be appreciated that conversely when sensor 12 is moved by oscillating member 15 sensor 11 will initially move more quickly to its starting or normal position than sensor 12. It has been found that this arrangement, wherein the returning sensor more quickly approaches its starting position, has a favorable influence on control of the drive speed of the oscillating member 15.

Figure 7:
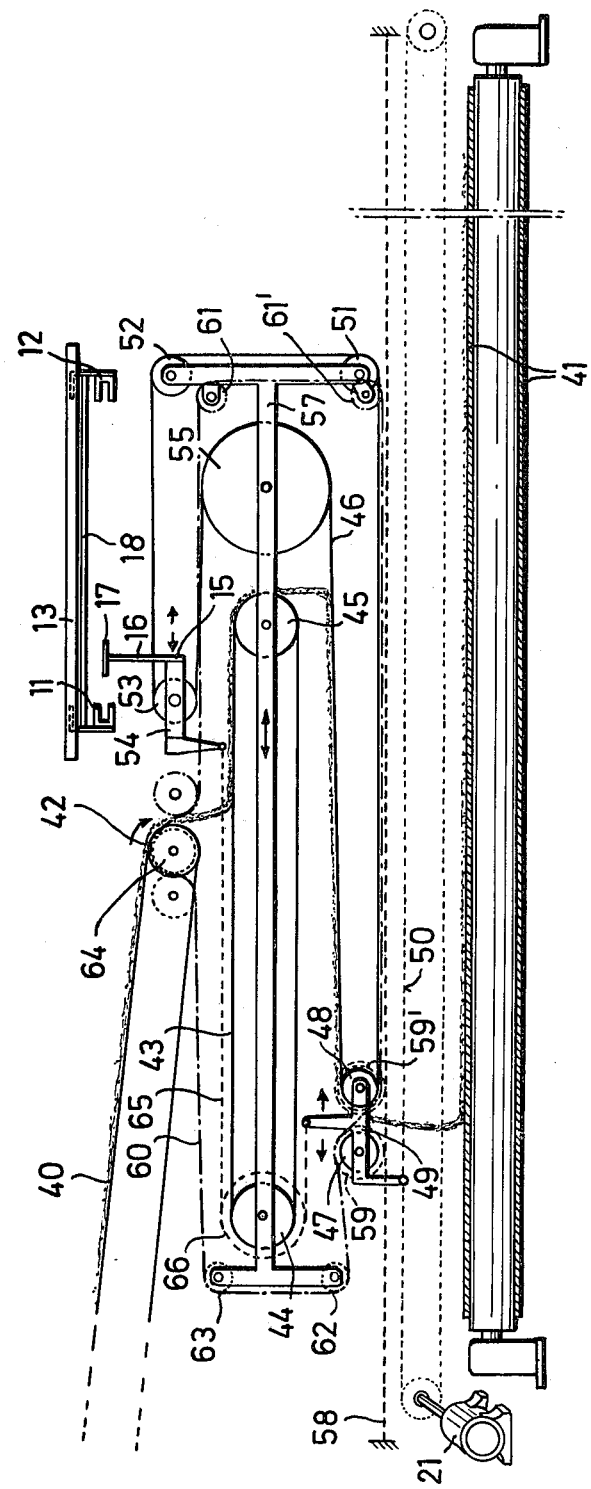
FIG. 7 is a schematic side view of a fleece layer with which the control device may be used.

FIG. 7 illustrates schematically a working example of a machine in which the control device of the invention may be used. The machine is adapted for laying nonwoven fabrics. Reference is made to copending application Ser. No. 775,022 filed Mar. 7, 1977 by Hille which copending application is incorporated by reference. The machine comprises a conveyor belt 40 driven at constant speed for supplying fibrous material from a carding machine or the like. The non-woven material is laid uniformly on a laying belt 41 extending transversely to the conveyor belt 40. This is accomplished by a laying device which oscillates along a path transverse to the laying belt 41 laying the fleece uniformly on the belt.

The non-woven material on conveyor belt 40 passes around guide roll 42 and drops on a storage belt 43 passing about guide rolls 44, 45. At the end of the storage belt 43, the fibrous material drops on a further conveyor belt 46 running over one of two laying rolls 47, 48. The laying rolls 47, 48 rotate anti-clockwise and form therebetween a laying gap through which the fibrous material drops on the laying belt 41. The two laying rolls 47, 48 are rotatably attached on a carriage 49 which moves to and fro along a path transverse to the laying belt 41. Electric motor 21 drives a drive chain 50 to which the carriage 49 is attached to move the carriage 49 along the transverse path. The motor 21 is switched periodically between forward and reverse directions to advance and return the carriage 49. The carriage 49 constitutes the periodically oscillating member 15 and the speed of the motor 21 is controlled by the circuit shown in FIG. 2.

Belt 46 moves over two guide rolls 51, 42 and over another guide roll 53 supported by a balancing carriage 54. Thereafter the belt moves further over roll 55 to carriage 49.

The two rolls 44 and 45 of the storage belt 43 and rolls 51, 52, 55 of the conveyor belt 46 are supported by a storage carriage 57 arranged to move horizontally along guide means (not illustrated).

The conveyor belt 46 is driven at constant speed by roll 53. The roll 53 is driven synchronously with the rotation of roll 52 of the feeding conveyor via a transmission unit (not illustrated) so that the belt 46 has the same speed as the conveyor belt 40.

The speed at which the carriage 49 oscillates along its path about the laying belt 41 must correspond on the average to the speed of the conveyor belt 40. The carriage 49 moves to and fro constantly and consequently must periodically be slowed or accelerated since a constant uniform speed, though desired, cannot be achieved. To insure that the fleece material is laid uniformly on the laying belt 41 a balancing carriage 54 is provided which moves horizontally, the operation of which will be explained hereinafter.

To measure the prevailing speed of the laying carriage 49, a measuring chain 58 is provided which extends parallel to the drive chain 50 and is secured between two stationary points. Freely rotatable gears 59, 60 are mounted on the axles of the laying rolls 47, 48 and are driven by the measuring chain 58. The speed of the gears 59, 60 corresponds to the travel speed of the laying carriage 49. Gear 59 (via a free-wheel) and gear 59' (via a clutch engaged at the points where the laying carriage 49 reverse direction) drive further gears (not illustrated) through a control chain 60 which is always driven in the same direction with the advance and the return of the laying carriage 49.

Control of the movements of the storage carriage 57 and of the balancing carriage 54 is maintained by control chain 60. Control chain 60 is driven by a pinion 64 with roll 42 of the feeding conveyor on a common shaft so that the control chain 60 has the same drive speed as conveyor belt 40. The chain 60 subsequently runs about two guide wheels 61, 61' supported at the storage carriage 57 and over the gears of the laying carriage 49. At the outer end of the storage carriage 57 are two other guide wheels 62 and 63, and from there the chain 60 runs back to the drive chain wheel 64 driven by the conveyor belt 40.

The operation of the fleece layer will now be described. The laying carriage 49 moves to and fro along the path about the laying belt 41. When moving to the right from the position shown in FIG. 7, the storage carriage 57 is moved at half the speed of the laying carriage 49 by the control chain 60 of the assembly. The laying carriage is connected via a traction rope 65 running over a guide roll 66 of the storage carriage 57 with the balancing carriage 54 to draw it to the right side. The lower loop of the belt 46 is reduced while the upper loop is increased.

The speed of the laying carriage 49 which is not constant must correspond on the average to the speed of the conveyor belt 40. The control chain 60 is driven at two points, namely, at its upper run by gear 64 with the feeding speed of the fleece and at its lower run by the measuring chain corresponding to the actual speed of the laying carriage 49. If the speed of the carriage 49 is less than the fleece speed, there is formed at the guide rolls 62, 63 a traction force to the right which acts on the storage carriage 57, while no traction force acts at the guide wheel 61. Due to the traction of the belt 46, the balancing carriage 54 is also drawn to the right so that the lower loop of the belt 46 is extended temporarily while the upper loop of the belt is shortened. If the speed of the laying carriage 49 corresponds exactly to the speed of the fleece, no substantial traction takes place in the control chain 60 so that the balancing carriage 54 is not displaced.

The constant braking and acceleration during the to and fro movement of the laying carriage 49 brings about periodic balancing movements of the balancing carriage 54. If the average speed by which the motor 21 is driving the laying carriage 49 is not exactly equal to the speed of belt 40, the movements of the balancing carriage 54 will be either predominantly to the left over those movements to the right or vice versa. To limit the travel of the oscillating balancing carriage 54 the control device of the invention with the sensors 11, 12 is used which, subject to the size of the amplitude in one direction or the other, periodically adjusts the speed of the motor 21.

The present invention is not restricted to the use of the control device for fleece laying machines but may be used generally where the drive speed of an independent drive for a periodic to and fro movement must be adapted to a specific speed, and in cases in which by the control of a parameter the range of the to and fro moving device will be controlled.

We claim:

1. A control device for a periodically oscillating member driven by driving means, the amplitudes of which member are different from each other when not oscillating within a predetermined oscillation range, said control device comprising:
    (a) a pair of spaced movable sensors located along the path of said oscillating member for sensing the amplitude of said oscillating member in both directions and arranged to be engaged by said oscillating member and emit a signal when engaged;
    (b) means movably supporting and guiding each of said movable sensors such that said sensor may be moved in one direction by said oscillating member when engaged thereby to a position where said oscillating member stops and may return in the opposite direction during movement of said oscillating member in the opposite direction;
    (c) coupling means for rigidly coupling said pair of spaced movable sensors whereby when one of said sensors is engaged and moved by said oscillating member the other sensor is moved in the same direction to return said other sensor; and
    (d) control means for receiving signals from said sensors and in response thereto adjusting the speed of said drive means to maintain said oscillating member at a predetermined average speed.

2. A control device according to claim 1 further comprising a stationarily mounted auxiliary sensor adjacent each of said movable sensors and arranged to sense the presence of said oscillating member when adjacent thereto, said auxiliary sensor being adapted to prevent signals emitted by said movable sensor during the presence of said oscillating member adjacent to said auxiliary sensor to be transmitted to said control means.

3. A control device according to claim 1 wherein said means movably supporting and guiding each of said sensors comprises a pivotably mounted arm supporting each of said sensors and means interconnecting said arms whereby said arms pivot together.

4. A control device according to claim 3 wherein said arms include elements extending transversely therefrom in opposite directions, respectively, said interconnecting means being pivotally connected at opposite ends to said elements and being of predetermined length such that said arms extend parallel to each other.

5. A machine comprising:
    (a) a periodically oscillating member;
    (b) means for driving said oscillating member wherein the amplitudes of said oscillating member are different from each other when not oscillating within a predetermined oscillation range;
    (c) a pair of spaced movable sensors located along the path of said oscillating member for sensing the amplitude of said oscillating member in both directions and arranged to be engaged by said oscillating member and emit a signal when engaged;
    (d) means movably supporting and guiding each of said movable sensors such that said sensor may be moved in one direction by said oscillating member when engaged thereby to a position where said oscillating member stops and may return in the opposite direction during movement of said oscillating member in the opposite direction;
    (e) coupling means for rigidly coupling said pair of spaced movable sensors whereby when one of said sensors is engaged and moved by said oscillating member the other sensor is moved in the same direction to return said other sensor; and
    (f) control means for receiving signals from said sensors and in response thereto adjusting the speed of said drive means to maintain said oscillating member at a predetermined average speed.

6. A machine according to claim 5 further comprising a stationarily mounted auxiliary sensor adjacent each of said movable sensors and arranged to sense the presence of said oscillating member when adjacent thereto, said auxiliary sensor being adapted to prevent signals emitted by said movable sensor during the presence of said oscillating member adjacent to said auxiliary sensor to be transmitted to said control means.

7. A machine according to claim 5 wherein said means movably supporting and guiding each of said sensors comprises a pivotably mounted arm supporting each of said sensors and means interconnecting said arms whereby said arms pivot together.

8. A machine according to claim 7 wherein said arms include elements extending transversely therefrom in opposite directions, respectively, said interconnecting means being pivotally connected at opposite ends to said elements and being of predetermined length such that said arms extend parallel to each other.

9. A control device for a periodically oscillating member driven by driving means, the amplitudes of which member are different from each other when not oscillating within a predetermined oscillation range, said control device comprising:
    (a) a pair of spaced movable sensors located along the path of said oscillating member for sensing the amplitude of said oscillating member in both directions and arranged to be engaged by said oscillating member and emit a signal when engaged;
    (b) means movably supporting and guiding each of said movable sensors such that said sensor may be moved in one direction by said oscillating member when engaged thereby to a position where said oscillating member stops and may return in the opposite direction during movement of said oscillating member in the opposite direction;
    (c) biasing means arranged to bias said movable sensors towards each other and maintain each of said sensors at a starting position;
    (d) retaining means for temporarily retaining each said sensor at said position where said oscillating member stops following movement thereof in one direction, said retaining means being adapted to be actuated by the movement of said oscillating member in the opposite direction to subsequently release said retaining means to permit said sensor to return to said starting position; and (e) control means for receiving signals from said sensors and in response thereto adjusting the speed of said drive means to maintain said oscillating member at a predetermined average speed.

10. A control device according to claim 9 wherein said retaining means for each movable sensor comprises a pivoted cam rod having a rack for engaging one of said sensors and a surface adapted to be engaged by said oscillating member to release said rack from said sensor.

11. A machine comprising:
(a) a periodically oscillating member;
(b) means for driving said oscillating member wherein the amplitudes of said oscillating member are different from each other when not oscillating within a predetermined oscillation range;
(c) a pair of spaced movable sensors located along the path of said oscillating member for sensing the amplitude of said oscillating member in both directions and arranged to be engaged by said oscillating member and emit a signal when engaged;
(d) means movably supporting and guiding each of said movable sensors such that said sensor may be moved in one direction by said oscillating member when engaged thereby to a position where said oscillating member stops and may return in the opposite direction during movement of said oscillating member in the opposite direction;
(e) biasing means arranged to bias said movable sensors towards each other and maintain each of said sensors at a starting position;
(f) retaining means for temporarily retaining each said sensor at said position where said oscillating member stops following movement thereof in one direction, said retaining means being adapted to be actuated by the movement of said oscillating member in the opposite direction to subsequently release said retaining means to permit said sensor to return to said starting position; and
(g) control means for receiving signals from said sensors and in response thereto adjusting the speed of said drive means to maintain said oscillating member at a predetermined average speed.

12. A machine according to claim 1 wherein said retaining means for each movable sensor comprises a pivoted cam rod having a rack for engaging one of said sensors and a surface adapted to be engaged by said oscillating member to release said rack from said sensor.

* * * * *